United States Patent
Themelis

(10) Patent No.: US 11,379,954 B2
(45) Date of Patent: Jul. 5, 2022

(54) SIGNAL TO NOISE RATIO ADJUSTMENT CIRCUIT, SIGNAL TO NOISE RATIO ADJUSTMENT METHOD AND SIGNAL TO NOISE RATIO ADJUSTMENT PROGRAM

(71) Applicant: Leica Instruments (Singapore) Pte. Ltd., Singapore (SG)

(72) Inventor: George Themelis, Lindau (DE)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 69 days.

(21) Appl. No.: 16/837,006

(22) Filed: Apr. 1, 2020

(65) Prior Publication Data
US 2020/0334792 A1 Oct. 22, 2020

(30) Foreign Application Priority Data
Apr. 17, 2019 (EP) ..................................... 19169859

(51) Int. Cl.
*G06T 5/00* (2006.01)
*G06T 5/50* (2006.01)
*H04N 7/18* (2006.01)

(52) U.S. Cl.
CPC ............. *G06T 5/002* (2013.01); *G06T 5/50* (2013.01); *H04N 7/183* (2013.01);
(Continued)

(58) Field of Classification Search
CPC ........... G06T 5/002; G06T 5/50; G06T 5/003; G06T 5/001; G06T 5/10; G06T 5/20;
(Continued)

(56) References Cited

U.S. PATENT DOCUMENTS 5,561,611 A * 10/1996 Avinash .................... G06K 9/40
382/279
7,043,291 B2 * 5/2006 Sendai .................... A61B 1/045
600/160

(Continued)

FOREIGN PATENT DOCUMENTS

EP 3588430 A1 * 1/2020 ............... G06T 5/20
EP 3624047 A1 * 3/2020 ............. G06T 5/003

(Continued)

OTHER PUBLICATIONS

Mayumi Kitagawa el al., 14. The latest trend in fluoroscopic imaging of X-ray TV systems, Innervision Co., Ltd., Nov. 25, 2017, vol. 32, No. 12, pp. 52-55.

*Primary Examiner* — Jose L Couso
(74) *Attorney, Agent, or Firm* — 2SPL Patent Attorneys PartG mbB; Kieran O'Leary

(57) ABSTRACT

A signal to noise ratio adjustment circuit is configured to determine, whether a signal to noise ratio of a first image is below a first threshold and to determine, whether a variation of imaged content between the first image and a preceding second image of a video sequence is below a second threshold. The signal to noise ratio adjustment circuit is further configured to generate a third image having an increased signal to noise ratio as compared to the first image or the second image if the signal to noise ratio is below the first threshold and if the variation is below the second threshold.

15 Claims, 3 Drawing Sheets

Legend
310: Determining whether a SNR of a first image is below a first threshold 320: Determining whether a variation of imaged content between the first image and a preceding second image of a video sequence is below a second threshold 320a: Determining the variation of imaged content using a first image and a second image having different image characteristics than the third image 330: Generating a third image having an increased SNR as compared to the first mage or the second image if the SNR may be below the first threshold and if the variation may be below the second threshold

(52) U.S. Cl.
CPC ............... *G06T 2207/10016* (2013.01); *G06T 2207/10056* (2013.01); *G06T 2207/10064* (2013.01); *G06T 2207/20182* (2013.01); *G06T 2207/20221* (2013.01)

(58) Field of Classification Search
CPC . G06T 2207/10016; G06T 2207/10056; G06T 2207/10064; G06T 2207/20182; G06T 2207/20221; G06T 2207/10024; G06T 2207/10068; G06T 2207/20008; G06T 2207/30004; G06T 2207/20201; G06T 2207/10061; G06T 7/0012; G06T 7/136; G06T 7/174; G06T 7/97; H04N 7/183; H04N 5/217; H04N 5/23232; H04N 5/23248; H04N 5/235; H04N 5/2354; H04N 5/21; H04N 5/144; H04N 5/208; H04N 5/213; H04N 5/911; H04N 2005/2255; H04N 9/646; G02B 21/361; G02B 21/365; G02B 23/12; A61B 1/00009; A61B 1/00186; A61B 1/043; A61B 1/0005; A61B 2576/00; A61B 5/0071; A61B 5/7221; G16H 30/40; G11B 20/10046; G11B 5/035; G11B 5/59605; G11B 5/59622; H03G 3/3078; G06K 9/6215; G06K 9/40

See application file for complete search history.

(56) References Cited

U.S. PATENT DOCUMENTS

| | | | | |
|---|---|---|---|---|
| 7,599,536 B2* | 10/2009 | Kraus | ................... | G06T 7/0002 382/128 |
| 8,428,318 B2* | 4/2013 | Zhuo | ...................... | G06T 5/002 382/128 |
| 8,879,072 B2* | 11/2014 | Langholz | ........... | G01N 21/6458 356/601 |
| 8,963,949 B2* | 2/2015 | Forutanpour | ............. | G06T 5/50 345/611 |
| 8,964,089 B2* | 2/2015 | Imai | ................... | H04N 5/23229 348/333.01 |
| 9,241,139 B2* | 1/2016 | Ishihara | ............. | G01N 21/6456 |
| 10,609,416 B2* | 3/2020 | Novotny | .............. | H04N 19/136 |
| 10,869,645 B2* | 12/2020 | Fengler | ................ | A61B 5/0071 |
| 10,891,719 B2* | 1/2021 | Srivastava | ............. | A61B 5/726 |
| 2002/0191086 A1* | 12/2002 | Masuyama | .......... | G02B 21/365 348/229.1 |
| 2006/0023926 A1* | 2/2006 | Kraus | ................... | G06T 7/0002 382/128 |
| 2007/0058880 A1* | 3/2007 | Lienard | ................... | G06T 7/223 382/264 |
| 2007/0165961 A1 | 7/2007 | Lu | | |
| 2007/0247554 A1* | 10/2007 | Okumichi | ................. | G06T 5/50 348/607 |
| 2008/0002907 A1* | 1/2008 | Xu | ........................ | G06T 7/0002 382/274 |
| 2009/0059039 A1* | 3/2009 | Smith | .................... | H04N 5/235 348/241 |
| 2010/0165122 A1 | 7/2010 | Castorina et al. | | |
| 2010/0271393 A1 | 10/2010 | Forutanpour et al. | | |
| 2010/0303373 A1* | 12/2010 | Keelan | .................... | G06T 5/002 382/255 |
| 2012/0273676 A1* | 11/2012 | Kuijper | ................... | H01J 37/26 250/307 |
| 2012/0281132 A1* | 11/2012 | Ogura | ............... | H04N 5/232123 348/348 |
| 2013/0021447 A1* | 1/2013 | Brisedoux | .......... | H04N 5/23232 348/47 |
| 2013/0148233 A1* | 6/2013 | Xia | ........................ | G11B 5/035 360/65 |
| 2015/0049215 A1* | 2/2015 | Kuang | ................. | H04N 5/2355 348/231.6 |
| 2016/0165156 A1* | 6/2016 | Liege | ..................... | H04N 5/357 348/216.1 |
| 2016/0180190 A1* | 6/2016 | Lifshin | ................... | H01J 37/28 382/201 |
| 2017/0024867 A1* | 1/2017 | Bousquet | ............. | G06K 9/0063 |
| 2017/0134717 A1* | 5/2017 | Trail | .................... | H04N 13/254 |
| 2017/0332017 A1* | 11/2017 | Robinson | ............... | H04N 5/332 |
| 2017/0354392 A1 | 12/2017 | Fengler | | |
| 2019/0082081 A1* | 3/2019 | Yang | ....................... | H04N 5/213 |
| 2020/0154029 A1* | 5/2020 | Mitsui | ................... | F21V 14/003 |
| 2021/0248720 A1* | 8/2021 | Ziesche | .................. | G06T 5/002 |

FOREIGN PATENT DOCUMENTS

| | | |
|---|---|---|
| JP | 2003-024268 A | 1/2003 |
| JP | 2013-026950 A | 2/2013 |
| JP | 2018-006993 A | 1/2018 |
| WO | 2008136771 A1 | 11/2008 |
| WO | 2012114934 A1 | 8/2012 |
| WO | 2015135394 A1 | 9/2015 |

* cited by examiner

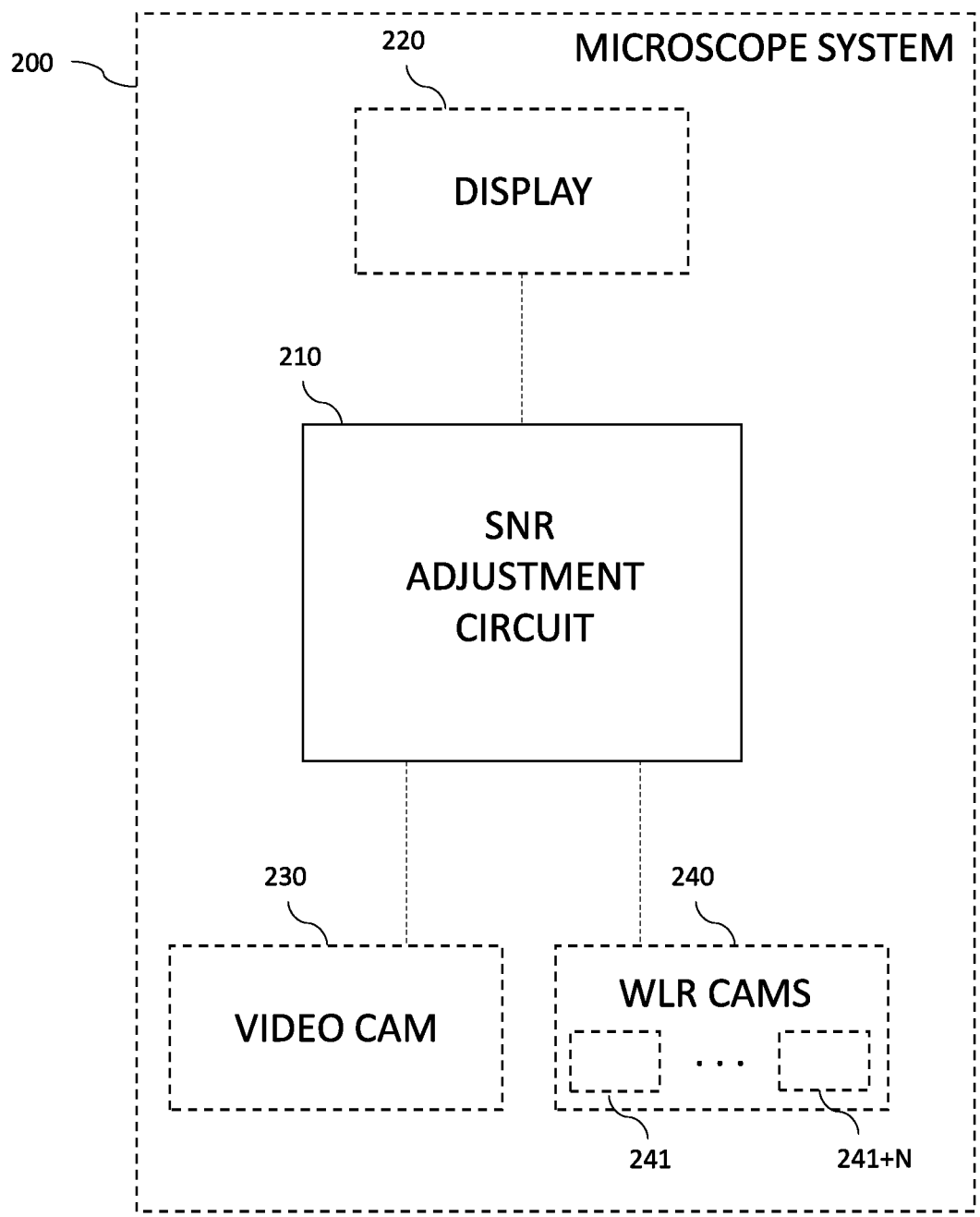

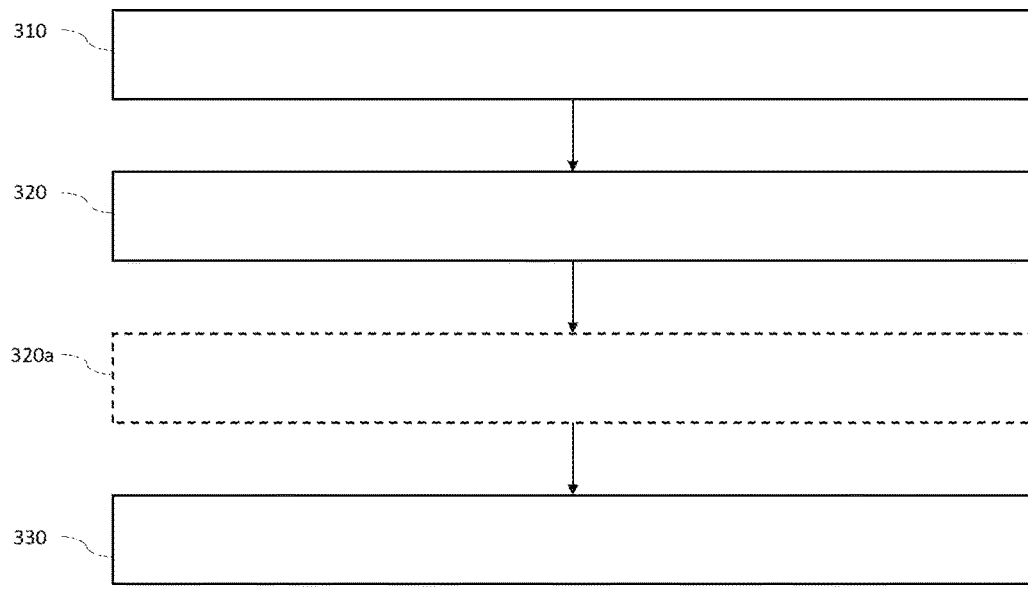

Fig. 3

Legend

310: Determining whether a SNR of a first image is below a first threshold

320: Determining whether a variation of imaged content between the first image and a preceding second image of a video sequence is below a second threshold 320a: Determining the variation of imaged content using a first image and a second image having different image characteristics than the third image 330: Generating a third image having an increased SNR as compared to the first mage or the second image if the SNR may be below the first threshold and if the variation may be below the second threshold

SIGNAL TO NOISE RATIO ADJUSTMENT CIRCUIT, SIGNAL TO NOISE RATIO ADJUSTMENT METHOD AND SIGNAL TO NOISE RATIO ADJUSTMENT PROGRAM

CROSS-REFERENCE TO RELATED APPLICATION

This application claims priority to European Application 19169859.6, filed on Apr. 17, 2019. The contents of the earlier filed application is incorporated by reference herein in its entirety.

TECHNICAL FIELD

Examples relate to signal to noise ratio adjustment circuits and microscope systems for fluorescence microscopy.

BACKGROUND

In applications of lowlight imaging such as fluorescence and surgical microscopy, signal-to-noise ratio of cameras may be a bottleneck for the imaging process. The reason is that the fluorescence intensity may not be high enough to provide a clear picture at video frame rates. As a result, images may become overly noisy. Hence, there is a need for an improved concept for adjusting the signal to noise ratio of images.

SUMMARY

An embodiment relates to a signal to noise ratio (SNR) adjustment circuit, which is configured to determine, whether a SNR of a first image is below a first threshold. Further, it is configured to determine, whether a variation of imaged content between the first image and a preceding second image of a video sequence is below a second threshold. The SNR adjustment circuit is further configured to generate a third image having an increased SNR as compared to the first image or the second image if the SNR is below the first threshold and if the variation is below the second threshold.

The SNR adjustment circuit determines whether the signal to noise ratio of the first image is too low and whether there could be a variation of imaged content in the video sequence which may be too high. Depending on the signal to noise ratio of the first image and whether there may be a variation of imaged content of the video sequence, a third image having an increased SNR may be generated which may optionally be used within a video sequence.

In an exemplary embodiment, generating the third image may comprise combining at least two images to provide the third image, which may improve the image quality of the video sequence by increasing the signal to noise ratio while not introducing significant impairments.

In another exemplary embodiment, combining the at least two images may comprise adding the at least two images.

In a further example, combining the at least two images may comprise calculating a statistical distribution of pixel values for the at least two images, and combining the at least two images based on the statistical distribution. In this way, only pixel values fulfilling a predetermined criterion derived from the calculated statistical distribution may be taken into account for combining the at least two images, which may result in a higher SNR of the third image.

An optional embodiment may further calculate motion compensation information using the first image and the second image. Combining the at least two images may comprise performing motion compensation on at least one of the at least two images using the motion compensation information. By use of the motion compensation, the first image and the second image may be combined, even if a conventional combination of the first image and the second image would result in motion blur effects.

In a further embodiment, generating the third image may comprise causing an increase of an exposure time for capturing the third image. By use of longer exposure time, the noise effects can be reduced.

Another embodiment may further use a first image and a second image having different image characteristics than the third image to determine the variation of imaged content. The first image and the second image of a certain characteristics can be used to calculate, for example, the necessary information for determining whether there may be a high variation of the imaged content, which may result in a risk of generating motion blur effects when combining subsequent images.

In an exemplary embodiment, the first image and the second image may be white light images. The motion compensation determined out of two white light images can be applied to fluorescence images. Due to the fact that white light images may have a high signal to noise ratio, a variation of imaged content between the first image and the second image can be determined more accurately by use of white light images in order to calculate the motion variation to be applied on fluorescence images.

Another example may further comprise an input interface configured to receive a video sequence comprising multiple images, which may allow to use an embodiment of a signal to noise ratio (SNR) adjustment circuit as an add on to existing cameras.

A further example may generate a fluorescence image as the third image. The generated fluorescence image may be used to generate a video sequence of fluorescence images with increased SNR and without significant motion blur effects.

Another embodiment may avoid generating a third image having the increased SNR if the SNR is below the first threshold and if the variation is above the second threshold. In this way, the generation of third images can be avoided, which means that a third image may not be generated when an increase of the SNR may come at the cost of unacceptably high motion blur.

As another exemplary embodiment, a microscope system may comprise a Fluorescence camera, a display and a SNR adjustment circuit. Such microscope systems may have the advantage to capture fluorescence images of an object to be observed at an increased SNR of the fluorescence images while avoiding the generation of motion blur. Optionally, the microscope system may further comprise white light reflection cameras for capturing white light images for motion estimation of the imaged content.

As another embodiment, a signal-to-noise-ratio (SNR) adjustment method may comprise determining, whether a SNR of a first image is below a first threshold. It further comprises determining, whether a variation of imaged content between the first image and a preceding second image of a video sequence is below a second threshold. The SNR adjustment method further comprises generating a third image having an increased SNR as compared to the first image or the second image if the SNR is below the first threshold and if variation is below the second threshold.

Another example may further comprise determining the variation of imaged content using a first image and a second image having different image characteristics than the third image.

As another exemplary embodiment, a computer program may have a program code for, when executed on a processor, causing the execution of a SNR adjustment method.

BRIEF DESCRIPTION OF THE FIGURES

Some examples of apparatuses and/or methods will be described in the following by way of example only, and with reference to the accompanying figures, in which FIG. 2 illustrates a microscope system comprising a signal to noise ratio adjustment circuit, and FIG. 3 is a flowchart illustrating the SNR adjustment method.

DETAILED DESCRIPTION

Figure 1:
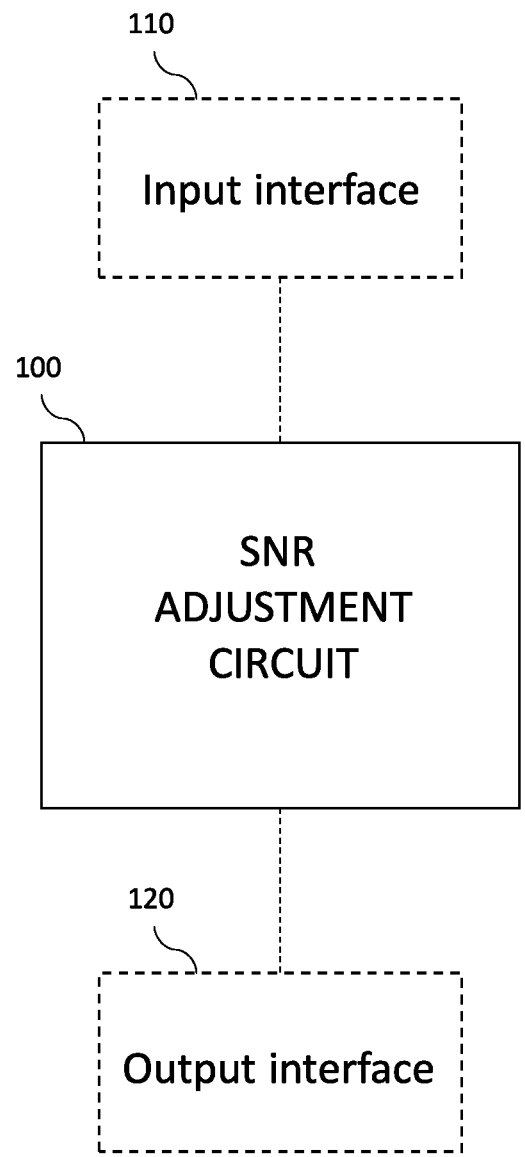
FIG. 1 illustrates a signal to noise ratio adjustment circuit.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

FIG. 1 schematically illustrates an embodiment of a SNR adjustment circuit.

In an embodiment, a SNR adjustment circuit 100 may determine, whether a SNR of a first image is below a first threshold. It may further determine, whether a variation of imaged content between the first image and a preceding second image of a video sequence is below a second threshold. The SNR adjustment circuit 100 may generate a third image having an increased SNR as compared to the first image or the second image if the SNR is below the first threshold and if the variation is below the second threshold.

The SNR adjustment circuit 100 determines whether signal to noise ratio of the first image is too low and whether there could be a variation of imaged content in the video sequence which may be too high for increasing a signal to noise ratio. For a video sequence with a high variation of imaged content (a lot of movement between individual pictures), for example, a combination of images may result in motion blur. Depending on the signal to noise ratio of the first image and whether there may be motion blur, a third image may be generated which may be added directly to the video sequence.

In an exemplary embodiment, generating the third image may comprise combining at least two images to provide the third image. An advantageous effect thereof may be to directly improve the image quality of the video sequence by reducing the noise without significantly increasing the motion blur effects, enabling an improved concept for adjusting the signal to noise ratio of, for example, images of microscopes. For example, combining the at least two images may comprise adding the at least two images.

Combining the at least two images may further or alternatively comprise calculating a statistical distribution of pixel values for the at least two images, and combining the at least two images based on the statistical distribution.

In this way, only pixel values fulfilling a predetermined criterion derived from the calculated statistical distribution may be taken into account for combining at least two images, which may result in a higher SNR of the third image (to reduce the noise).

Possible calculation methods or noise models for calculating the average SNR pixel values and corresponding standard deviation may be, for example, the Gaussian noise model (normal noise model), the Rayleigh noise model, the Erlang (gamma) noise model, the exponential noise model, the uniform noise model, or the impulse (salt-and-pepper) noise model.

Another optional embodiment may further calculate motion compensation information using the first image and the second image. Combining the at least two images may comprise performing motion compensation on at least one of the at least two images using the motion compensation information. By use of the motion compensation, the first image and the second image may be combined, even if a conventional combination of the first image and the second image would result in motion blur effects.

The at least two images to be combined may not necessarily be the first image and the second image used to estimate motion. The first image and the second images used for motion estimation may, for example, be white light images of a white light camera while the at least two images to be combined may be images of a video sequence of a fluorescence camera.

Motion blur effects may be defined as smearing of imaged content due to the fact that a single image includes information on (light from) the same object at different positions, which is caused by high speeds of the imaged object.

In a further embodiment, generating the third image may comprise causing an increase of an exposure time for capturing the third image. By use of longer exposure times, the noise effects can be reduced.

Another embodiment may further use a first image and a second image having different image characteristics than the third image to determine the variation of imaged content. The first image and the second image of a different certain characteristics can be used to calculate, for example, the necessary mathematical information for determining whether there may be a high variation of the imaged content, which may correspondingly mean that there may be a danger of motion blur effects.

Different image characteristics or image types may be white light images, fluorescence images, thermal images, x-ray images, TEM images, REM image, AFM images or STM images. The image type is, however, not limited to the above-mentioned examples. It may also be any other type of image characteristics.

In an exemplary embodiment, the first image and the second image may be white light images. The motion compensation, determined out of two white light images, can be applied to fluorescence images resulting in reduced motion blur effects. Due to the high signal to noise ratio of white light images, a variation of imaged content between the first image and the second image may be determined more accurately by use of white light images in order to calculate the motion variation to be applied on fluorescence images.

Another example may further comprise an input interface 110 configured to receive a video sequence comprising multiple images, which may allow to use an embodiment of a signal to noise ratio (SNR) adjustment circuit 100 as an add-on to existing cameras; and an output interface 120 configured to output a third image with, for example, a higher SNR.

A further example may generate a fluorescence image as the third image. The generated fluorescence image may be used to generate a video sequence of fluorescence images with increased SNR and without significant motion blur effects.

Another embodiment may avoid generating a third image having the increased SNR if the SNR is below the first threshold and if the variation is above the second threshold.

When the object to be observed is not moving, conventional approaches might improve the image quality by increasing integration time, and consequently reducing frame rate. This change in setting may offer an improved SNR but suffer at the same time from motion blur when the object is moving. Therefore, in such cases, cameras are conventionally usually set to an adjustment which offers a good compromise between noise and motion blur, however not exploiting the optimal image quality in all operating conditions. Embodiments of SNR adjustment circuits, however, may dynamically increase SNR in conditions, where potentially resulting motion blur may be below an acceptable threshold.

As illustrated in FIG. 2, another exemplary embodiment may be a microscope system 200 comprising a Fluorescence camera 230, a display 220 and a SNR adjustment circuit 210. Optionally, the microscope system 200 may further comprise white light reflection cameras 240 for acquiring white light images. By use of the display 220, a surgeon may, for example, check on the fluorescence video sequence whether he performs corresponding surgery as de-sired.

Such microscope systems may have the advantage to capture fluorescence images of an object to be observed at an increased SNR of the fluorescence images while avoiding the generation of motion blur. Optionally, the microscope system may further comprise white light reflection cameras for capturing white light images for motion estimation of the imaged content.

The microscope system may be an optical microscope, a fluorescence microscope, a combination of an optical microscope and a fluorescence microscope providing both functions. The microscope system, however, is not limited to the above-named examples.

The display may be a LED display, an OLED display, a LED or an OLED display with an implemented touch panel or a CRT screen or monitor. The type of the display is, however, not limited to the above-named examples. It may also be any other type of display.

The SNR adjustment circuit may be a semiconductor circuit implemented directly in the microscope, a CPU/computer inside the microscope or connected externally with the microscope in order to perform the computer program for executing the SNR adjustment method, or a circuit being connected via Wi-Fi or Bluetooth to a mobile device, like for example a smart phone or tablet. The type of the SNR adjustment circuit is however not limited to the above examples.

The video camera may be an optical camera, a fluorescence camera, a thermal imaging camera or any other type of cameras.

The white light reflection cameras may be two or more white light reflection cameras being capable to acquire white light images.

In FIG. 3, an exemplary embodiment is illustrated. A SNR adjustment method may comprise the following steps: determining, whether a SNR of a first image is below a first threshold 310; determining, whether a variation of imaged content between the first image and a preceding second image of a video sequence is below a second threshold 320; and generating a third image having an increased SNR as compared to the first image or the second image if the SNR may be below the first threshold and if the variation may be below the second threshold 330.

In an additional example, the SNR adjustment method may further comprise determining the variation of imaged content using a first image and a second image having different image characteristics than the third image 320a, which is also illustrated in FIG. 2.

In detail, determining, whether a SNR of a first image may be below a first threshold means to determine whether noise in the first image may be too high. Determining whether a variation of imaged content between the first image and a preceding second image of a video sequence may be below a second threshold means to determine whether movements of an observed object may cause motion blur effects in the video sequence, in particular in the variation of subsequent images between the first image and the second image of the video sequence. In case, the degree of the motion blur effects is too high to obtain a proper video sequence, a third image may be generated, which means that the generated third image may be an additional image to add to the video sequence as a subsequent image in order to increase the frames per second which may result in reduced motion blur.

This method is not limited to provide subsequent fluorescence images. It may also be applied to thermal images, x-ray images, TEM images, REM image, AFM images or STM images. The image type is, however, not limited to the above-mentioned examples. It may also be any other type of image characteristics.

As another additional embodiment, a computer program may have a program code for, when executed on a processor, causing the execution of a SNR adjustment method.

The computer program may be a software for operating a microscope including the SNR adjustment circuit for executing the SNR adjustment method.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

LIST OF REFERENCE SIGNS

100 SNR adjustment circuit
110 input interface
120 output interface
200 microscope system
210 SNR adjustment circuit
220 display
230 fluorescence camera
240 white light reflection cameras
310 determining, whether a SNR of a first image is below a first threshold
320 determining, whether a variation of imaged content between the first image and a preceding second image of a video sequence is below a second threshold
320a determining the variation of imaged content using a first image and a second image having different image characteristics than the third image
330 generating a third image having an increased SNR as compared to the first image or the second image if the SNR is below the first threshold and if the variation is below the second threshold

What is claimed is:

1. A signal to noise ratio adjustment circuit configured to process a video sequence comprising multiple images, the signal to noise ratio adjustment circuit configured to:
   determine whether a signal to noise ratio of a first image of the video sequence is below a first threshold;
   determine whether a motion variation of imaged content between the first image and a preceding second image of the video sequence is below a second threshold; and
   generate a third image having an increased signal to noise ratio as compared to the first image or the second image if the signal to noise ratio is below the first threshold and if the motion variation is below the second threshold,
      wherein generating the third image comprises combining at least two images of the video sequence to provide the third image,
      wherein the at least two images comprise the first image and the second image.

2. The signal to noise ratio adjustment circuit according to claim 1, further comprising adding the third image to the video sequence.

3. The signal to noise ratio adjustment circuit according to claim 2, wherein combining the at least two images comprises adding the at least two images.

4. The signal to noise ratio adjustment circuit according to claim 2, wherein combining the at least two images comprises:
   calculating a statistical distribution of pixel values for the at least two images, and
   combining the at least two images based on the statistical distribution.

5. The signal to noise ratio adjustment circuit according to claim 1, further configured to:
   calculate motion compensation information using the first image and the second image, wherein
      combining the at least two images comprises performing motion compensation on at least one of the at least two images using the motion compensation information.

6. The signal to noise ratio adjustment circuit according to claim 1, wherein generating the third image comprises causing an increase of an exposure time for capturing the third image.

7. The signal to noise ratio adjustment circuit according to claim 1, wherein
   the first image and the second image have different image characteristics than the third image.

8. The signal to noise ratio adjustment circuit according to claim 1, wherein the first image and the second image are white light images.

9. The signal to noise ratio adjustment circuit according to claim 1, further comprising:
   an input interface configured to receive the video sequence comprising multiple images.

10. The signal to noise ratio adjustment circuit according to claim 1, configured to generate a fluorescence image as the third image.

11. The signal to noise ratio adjustment circuit according to claim 1, further configured to not generate a third image having the increased signal to noise ratio if the signal to noise ratio is below the first threshold and if the motion variation is above the second threshold.

12. A microscope system comprising:
   a fluorescence camera, a display, and a signal to noise ratio adjustment circuit according to claim 1.

13. A signal to noise ratio adjustment method to process a video sequence comprising multiple images, the method comprising:
   determining whether a signal to noise ratio of a first image of the video sequence is below a first threshold;
   determining whether a motion variation of imaged content between the first image and a preceding second image of the video sequence is below a second threshold; and
   generating a third image having an increased signal to noise ratio as compared to the first image or the second image if the signal to noise ratio is below the first threshold and if the motion variation is below the second threshold,
      wherein generating the third image comprises combining at least two images of the video sequence to provide the third image,
      wherein the at least two images comprise the first image and the second image.

14. The signal to noise ratio adjustment method according to claim 13 further comprising:
   determining the variation of imaged content using a first image and a second image having different image characteristics than the third image.

15. A non-transitory, computer-readable medium comprising a program code for, when the program code is executed on a processor, causing the execution of a method according to claim 13.

* * * * *